United States Patent [19]

Warren

[11] Patent Number: 5,200,455
[45] Date of Patent: Apr. 6, 1993

[54] AQUEOUS ADHESIVE COMPOSITIONS CONTAINING STABILIZED PHENOLIC RESINS

[75] Inventor: Patrick A. Warren, Erie, Pa.
[73] Assignee: Lord Corporation, Erie, Pa.
[21] Appl. No.: 828,337
[22] Filed: Jan. 30, 1992
[51] Int. Cl.⁵ ............................................. C08K 3/10
[52] U.S. Cl. .................................. 524/413; 524/430; 524/431; 524/432; 524/433; 524/503; 524/510
[58] Field of Search .............. 524/430, 431, 432, 433, 524/503, 510, 413, 376, 364, 378, 379

[56] References Cited

U.S. PATENT DOCUMENTS

| | | | |
|---|---|---|---|
| 4,124,554 | 11/1978 | Fry | 524/510 X |
| 4,148,963 | 4/1979 | Bourrain | 524/510 X |
| 4,167,500 | 9/1979 | Jazenki et al. | 260/29.3 |
| 4,255,486 | 3/1981 | Burke, Jr. et al. | 524/510 X |
| 4,400,229 | 8/1983 | Demmer et al. | 524/510 X |
| 4,439,556 | 3/1984 | Girgis | 524/510 X |
| 4,699,945 | 10/1987 | Hausdorf et al. | 524/510 X |
| 4,988,753 | 1/1991 | Rullmann et al. | 524/260 |
| 5,036,122 | 7/1991 | Auerbach et al. | 524/259 |

Primary Examiner—Joseph L. Schofer
Assistant Examiner—J. M. Reddick
Attorney, Agent, or Firm—W. Graham Buie

[57] ABSTRACT

An aqueous primer composition containing a polyvinyl alcohol-stabilized aqueous phenolic resin dispersion, a latex of a halogenated polyolefin, and a metal oxide. The phenolic resin dispersion is prepared by mixing (a) a pre-formed, solid substantially water-insoluble, phenolic resin; (b) water; (c) an organic coupling solvent; and (d) polyvinyl alcohol, at a temperature and for a period of time sufficient to form a dispersion of said phenolic resin in water. The aqueous primer composition substantially reduces the utilization of organic solvents, is resistant to pre-bake conditions, and provides for a robust adhesive bond which is flexible and resistant to adverse environments.

15 Claims, No Drawings

AQUEOUS ADHESIVE COMPOSITIONS CONTAINING STABILIZED PHENOLIC RESINS

FIELD OF THE INVENTION

The present invention relates to the bonding of various substrates to surfaces such as ferrous and non-ferrous metal surfaces. More specifically, the present invention relates to an aqueous primer composition based on a latex of a halogenated polyolefin and a polyvinyl alcohol-stabilized phenolic resin dispersion.

BACKGROUND OF THE INVENTION

Governmental regulations regarding the use of volatile organic compounds (VOC) in industrial coatings and adhesives are becoming increasingly circumscribing with each passing year. Manufactures using adhesive compositions to bond various materials such as elastomeric materials to metal surfaces are therefore under an increasing pressure to reduce the amount of VOC utilized in their manufacturing processes. In order to continue utilizing adhesive and primer compositions based on organic solvents, these manufacturers will be required to purchase incineration equipment or reduce their manufacturing output in order to meet the increasingly demanding regulations. The purchase of incineration equipment and/or the reduction in manufacturing output will effectively reduce the profitability of numerous manufacturers which may result in the loss of jobs, thereby contributing to the current decline in the economy.

A more desirable response to the regulations regarding the use of VOC is the development of aqueous adhesive and primer compositions which would replace the current solvent-based adhesive and primer compositions utilized by manufacturers. With utilization of aqueous adhesive and primer compositions, the manufactures can continue their operations at the same rate and avoid the purchase of expensive incinerator equipment while simultaneously reducing worker exposure to the hazardous VOC.

Previous efforts to develop aqueous adhesive and primer compositions are manifested in various U.S. patents. For example, U.S. Pat. No. 4,167,500 describes an aqueous adhesive composition that contains a water dispersible novolak phenolic resin, a methylene donor such as an acetal homopolymer or acetal copolymer, and water. The phenolic resins described are primarily derived from resorcinol and alkylphenols such as p-nonylphenol although various other polyhydroxy phenols are mentioned, such as phloroglucinol and pyrogallol.

U.S. Pat. No. 4,988,753 describes an aqueous dispersion for bonding natural and synthetic elastomers to metallic and non-metallic substrates under vulcanizing conditions. The adhesive composition contains a mixture of chlorosulfonated polyethylene and vinyl chloride/vinylidene chloride/acrylic acid copolymer, an organic polynitroso compound, and a coreactive compound selected from diallyl acrylamide and phenylene bis-maleic acid imide. The adhesive composition may optionally contain other additives such as metal oxides, lead salts, and peroxides.

U.S. Pat. No. 5,036,122 describes an aqueous adhesive composition containing a latex of a polymerized conjugated diene, a poly-C-nitroso compound, and a polymaleimide compound which is a polymer of a bis-maleimide. The polymerized conjugated diene is preferably poly-2,3-dichlorobutadiene of poly-1,1,2-trichlorobutadiene. The adhesive may optionally contain additives such as carbon black, metallic oxides, and surfactants.

For purposes of further background, traditional adhesives utilized for bonding elastomeric materials to metal are frequently susceptible to the high temperature conditions experienced in the molding devices utilized in the bonding process. The molding devices which position and support the adhesive-coated metal parts are typically preheated or prebaked before the molten elastomeric material is applied to the metal part. This prebake frequently interferes with the bonding ability of the adhesive composition applied to the metal surface.

There is a continuing need for aqueous adhesive compositions which exhibit adhesion levels approximating the levels obtained by solvent-based adhesive compositions. Such aqueous adhesive compositions should be resistant to prebake conditions and provide for a flexible bond which is resistant to adverse environments such as corrosive materials and high temperature fluids.

SUMMARY OF THE INVENTION

The present invention is an aqueous primer composition which substantially reduces the utilization of organic solvents, is resistant to prebake conditions, and, when utilized in combination with an overcoat composition, provides for a robust adhesive bond which is flexible and resistant to adverse environments. The primer composition of the present invention comprises a polyvinyl alcohol-stabilized aqueous phenolic resin dispersion, a latex of a halogenated polyolefin, and a metal oxide. The present invention is preferably utilized as the primer component of a two-part (primer/overcoat) adhesive composition wherein the overcoat component comprises a latex of a halogenated polyolefin and a nitroso compound.

DETAILED DESCRIPTION OF THE INVENTION

The aqueous primer composition of the invention comprises a polyvinyl alcohol-stabilized aqueous phenolic resin dispersion, a latex of a halogenated polyolefin, and a metal oxide.

The polyvinyl alcohol-stabilized aqueous phenolic resin dispersion of the invention can be prepared by a process comprising mixing:

(a) a pre-formed, solid, substantially water-insoluble, phenolic resin;
(b) water;
(c) an organic coupling solvent; and
(d) polyvinyl alcohol, at a temperature and for a period of time sufficient to form a dispersion of said phenolic resin in water.

As used herein, the term "solid" refers to a phenolic resin whose glass transition temperature is substantially above room temperature, e.g. above about 35° C. As used herein, the term "substantially water-insoluble" refers to a phenolic resin that is not soluble in or miscible with water, although a small percentage of low molecular weight components in the resin may be water-soluble.

The polyvinyl alcohol is first dissolved in a mixture of water and coupling solvent, and the solid phenolic resin is then added slowly while increasing the agitation and temperature of the mixture. After agitating at high speed to temperatures of 55°–75° C., the dispersion forms without scrap or wasted material. Subsequent batches of the dispersion can be prepared immediately without having to clean the equipment. Laboratory scale batches can be made using a blender, but larger scale batches have been made with a lower speed Cowles dissolver. A commercial homogenizer is not necessary but can be used if desired. Not all of the water in the formulation need be added at first. This creates a more solvent-rich medium which, in some cases, eases the dispersion formulation. The remainder of the water is added after the dispersion is formed to achieved the desired water-coupling solvent ratio.

The phenolic resins that are employed in the invention are well known compositions. They are solid resoles or novolaks. The resoles employed are normally base catalyzed resins having a formaldehyde factor (i.e., parts, by weight, of 40 weight percent aqueous formaldehyde per 100 parts by weight of unsubstituted phenol) of the order of about 90 to about 180. The novolaks employed are normally acid catalyzed resins having a formaldehyde factor of the order of from about 50 to about 75.

The phenol employed for producing the phenolic resins of the invention can be unsubstituted phenol, or it can be a substituted phenol such as cresol, bisphenol-A, para-substituted phenols such as para-t-butylphenol, para-phenylphenol, and the like. Ordinarily, formaldehyde or a material that generates formaldehyde in situ is the aldehyde that is employed to make the phenolic resin.

One particularly desirable phenolic resin for use in the invention is a resole produced by reacting formaldehyde with bisphenol-A in a mol ratio of from about 2 to about 3.75 moles of formaldehyde per mole of bisphenol-A, in the presence of a catalytic amount of an alkali metal or barium oxide or hydroxide condensation catalyst, the reaction being carried out at elevated temperatures. The condensation reaction product is then neutralized to a pH of from about 3 to about 8. This phenolic resin is especially useful in the production of baked coatings for metals.

Another particularly useful type of phenolic resin is a novolak prepared from formaldehyde and phenol, wherein the phenol is predominantly a para-substituted phenol such as para-t-butylphenol or para-phenylphenol. One valuable phenolic resin for such use is a novalak prepared from a mixture of 20 percent by weight of unsubstituted phenol and 80 percent by weight of t-butylphenol, reacted with formaldehyde at a formaldehyde factor of 50, in the presence of an acid catalyst.

The phenolic resin that is employed need not be pulverized or ground to a very fine particle size, and it need not be dissolved in an organic solvent, prior to utilization in the process of the invention in the preparation of the aqueous dispersion. The phenolic resin will most typically be employed in the form of lumps, flakes, or a coarse ground powder. The nature and production of the phenolic resins that are employed in the invention are well known in the art.

The invention also utilizes a coupling solvent, that is, a solvent that is miscible with water and which is a solvent for the phenolic resin employed. The miscibility with water should be complete, and the phenolic resin should be soluble in the coupling solvent such that solutions of up to about 80 weight percent phenolic resin (based on solution weight) can be made. The boiling point of the coupling solvent is preferably within the range of from about 75° C. to about 230° C. Most volatile solvents, such as methanol and acetone, cause blistering in coatings made from the dispersions, and often have dangerously low flash points.

Alcohols, glycol ethers, ethers, esters, and ketones have been found to be the most useful coupling solvents. Specific examples of useful coupling solvents include ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, methoxy acetone, and the like.

The polyvinyl alcohol employed in the invention is typically prepared by hydrolysis of polyvinyl acetate, and the most useful polyvinyl alcohol polymers for use in the invention are hydrolyzed to an extent of from about 85 to about 91 percent, and have a molecular weight such that a 4 percent solids solution of the polyvinyl alcohol in water has a viscosity of from about 4 to about 25 centipoises at 25° C.

The proportions of the components for forming the phenolic resin dispersion are not narrowly critical. As a general rule, it is desirable to obtain as high solids a dispersion as possible. For preparing dispersions containing from about 40 to about 50 weight percent of phenolic resin, the percentage being based on the total weight of the dispersion, it has been found broadly that the proportion of coupling solvent can vary from about 15 volume percent to about 30 volume percent of the water/coupling solvent portion of the formulation. After preparation, the dispersion can be mixed with added water, if desired, to reduce the coupling solvent proportion to the 5–10 volume percent range. It has been found that the dispersions containing from about 15 to about 20 volume percent of coupling solvent have the best freeze-thaw stabilities. All percentages of coupling solvent are based upon the water/coupling solvent portion of the formulation.

The polyvinyl alcohol is employed in an amount sufficient to form and stabilize the dispersion. For instance, amounts from about 5.25 to about 13 weight percent of the phenolic resin/polyvinyl alcohol portion of the formulation are satisfactory. While more could be used, if desired, certain properties, such as water sensitivity, of the adhesive prepared from the dispersion could tend to be adversely affected if more polyvinyl alcohol were employed. As the proportion of polyvinyl alcohol becomes less than 5.25 percent, the stability of the dispersion tends to be reduced.

The phenolic resin is dispersed in the mixture of water, coupling solvent, and polyvinyl alcohol, using shearing agitation. The agitator can be a spinning propellor or disc, a rotating blade, or other agitator that imparts shearing force to the mixture. The time required for the mixing varies, depending on factors such as size of batch in relation to equipment, nature and proportion of ingredients, and the like. As a general rule from about 10 to about 60 minutes are required to complete the mixing. The amount or degree of shearing agitation cannot be quantified. It has not been found to be narrowly critical, and it is well within the skill of the art to determine the requisite amount of shearing agitation for particular cases.

The polyvinyl alcohol-stabilized phenolic resin dispersions of the present invention are also fully described in U.S. Pat. No. 4,124,554, the disclosure of which is incorporated herein by reference. The present phenolic resin dispersions are also commercially available from Union Carbide Corporation under the trade name BKUA-2370.

The polyvinyl alcohol-stabilized aqueous phenolic resin dispersion is typically utilized in an amount ranging from about 20 to 80, preferably from about 40 to 60, percent by weight based on the essential components of the present invention. "Essential components" herein refers to the polyvinyl alcohol-stabilized phenolic resin dispersion, the latex of a halogenated polyolefin, and the metal oxide.

The halogenated polyolefin of the latex of the present invention can essentially be any natural or synthetic halogenated polyolefin elastomer. The halogens employed in the halogenated polyolefinic elastomer are typically chlorine or bromine, although fluorine can also be used. Mixtures of halogens can also be employed in which case the halogen-containing polyolefinic elastomer will have more than one type of halogen substituted thereon. The amount of halogen does not appear critical and can range from as low as about 3 weight percent to more than 70 weight percent, depending on the nature of the base elastomer or polymer. Halogenated polyolefins and their preparation are well-known to those skilled in the art.

Representative halogenated polyolefins include chlorinated natural rubber, chlorine- and bromine-containing synthetic rubbers including polychloroprene, chlorinated polychloroprene, chlorinated polybutadiene, hexachloropentadiene, butadiene/halogenated cyclic conjugated diene adducts, chlorinated butadiene styrene copolymers, chlorinated ethylene propylene copolymers and ethylene/propylene/non-conjugated diene terpolymers, chlorinated polyethylene, chlorosulfonated polyethylene, brominated poly(2,3-dichloro-1,3-butadiene), copolymers of α-haloacrylonitriles and 2,3-dichloro-1,3-butadiene, chlorinated poly(vinyl chloride), and the like, including mixtures of such halogen-containing elastomers. Thus substantially any of the known halogen-containing derivatives of natural and synthetic elastomers can be employed in the practice of this invention, including mixtures of such elastomers.

The latex of the halogenated polyolefin of the present invention can be prepared according to methods known in the art such as by dissolving the halogenated polyolefin in a solvent and adding a surfactant to the resulting solution. Water can then be added to the solution under high shear to emulsify the polymer. The solvent is then stripped to obtain a latex having a total solids content of from about 10 to 60, preferably 25 to 50, percent by weight. The latex can also be prepared by emulsion polymerization of chlorinated ethylenically unsaturated monomers.

It has presently been discovered that chlorosulfonated polyethylene is particularly effective when utilized as the halogenated polyolefin of the present invention. The chlorosulfonated polyethylene of the latex is commercially available and can be prepared according to methods well known in the art, such as by dissolving polyethylene in carbon tetrachloride and subjecting the resulting solution to a mixture of chlorine gas and sulfur dioxide gas under high temperature and pressure. The carbon tetrachloride is then removed to produce a powder of chlorosulfonated polyethylene. The latex of chlorosulfonated polyethylene can be prepared according to the general method for preparing latexes described above.

The preferred chlorosulfonated polyethylene of the latex of the present invention typically has a molecular weight in the range of about 50,000–150,000, preferably about 60,000–120,000. The chlorine content of the chlorosulfonated polyethylene is typically is in the range of about 20–50, preferably about 25 to 45, percent while the sulfur content is typically in the range of about 0.5 to 2, preferably about 1.0 to 1.5 percent.

The latex of the halogenated polyolefin of the present invention is typically utilized in an amount ranging from about 10 to 40, preferably about 15 to 25, percent by weight of the essential components of the present invention.

The metal oxide of the present invention can be any known metal oxide such as the oxides of zinc, cadmium, magnesium, lead, and zirconium; litharge; red lead; zirconium salts; and combinations thereof, with zinc oxide being the preferred metal oxide due to its unusual compatibility with and effectiveness in the present adhesive compositions. The metal oxide is typically utilized in an amount ranging from about 10 to 80, preferably about 20 to 40, percent by weight of the essential components.

Water, preferably deionized water, is utilized in combination with the essential components of the present invention in order to provide an adhesive composition having a final solids content of between about 10 and 70 percent, preferably about 30 and 50 percent. In some instances, it may be desirable to utilize a minor amount of solvent in combination with the water to provide a carrier system containing water and co-solvent. Typical co-solvents useful for this purpose include alcohols, glycol ethers, and ketones, with propylene glycol methyl ether being presently preferred. The co-solvent and water are typically utilized in a water:co-solvent ratio ranging from about 45:1 to about 60:1.

It should be noted that when a novolak phenolic resin-based dispersion is utilized in the present invention, it may be advantageous to also utilize a formaldehyde donor for crosslinking with the novolak resin. The formaldehyde donor so utilized can be essentially be any type of formaldehyde known to react with hydroxy aromatic compounds to form novolak phenolic resins. Typical compounds useful as a formaldehyde source in the present invention included formaldehyde and aqueous solutions of formaldehyde, such as formalin; acetaldehyde; propionaldehyde; isobutyraldehyde; 2-ethylbutyraldehyde; 2-methylpentaldehyde; 2-ethylhexaldehyde; benzaldehyde; as well as compounds which decompose to formaldehyde, such as paraformaldehyde, trioxane, furfural, hexamethylenetetramine; anhydroformaldehydeaniline, ethylene diamine formaldehyde; acetals which liberate formaldehyde on heating; methylol derivatives of urea and formaldehyde; methylol phenolic compounds; and the like. The formaldehyde source is utilized in an amount ranging from about 1 to 25, preferably from about 5 to 15 percent by weight of the phenolic resin adhesion promoter. When utilizing an aqueous solution of formaldehyde such as formalin, the percent by weight of formaldehyde source is based on actual formaldehyde content.

Additionally, and preferred over the formaldehyde sources discussed immediately above, high molecular weight aldehyde homopolymers and copolymers can be employed as a latent formaldehyde source in the practice of the present invention. A latent formaldehyde source herein refers to a formaldehyde source which will release formaldehyde only in the presence of heat such as the heat applied during the curing of an adhesive system. Typical high molecular weight aldehyde homopolymers and copolymers include acetal homopolymers, acetal copolymers, gamma-polyoxy-methylene ethers having the characteristic structure:

$$R_{10}O\text{—}(CH_2O)_n\text{—}R_{11}; \text{ and}$$

polyoxymethylene glycols having the characteristic structure:

$$HO\text{—}(R_{12}O)_x\text{—}(CH_2O)_n\text{—}(R_{13}O)_x\text{—}H;$$

wherein $R_{10}$ and $R_{11}$ can be the same or different and each is an alkyl group having from 1 to 8, preferably 1 to 4, carbon atoms; $R_{12}$ and $R_{13}$ can be the same or different and each is an alkylene group having from 2 to 12, preferably 2 to 8, carbon atoms; n is greater than 100, and is preferably in the range from about 200 to about 2000; and x is in the range from 0 to 8, preferably 1 to 4, with at least one x being equal to at least 1. The high molecular weight aldehyde homopolymers and copolymers are further characterized by a melting point of at least 75° C., i.e., they are substantially inert with respect to the phenolic system until heat activated; and by being substantially completely insoluble in water at a temperature below the melting point. The acetal homopolymers and acetal copolymers are well-known articles of commerce. The polyoxymethylene materials are also well known and can be readily synthesized by the reaction of monoalcohols having from 1 to 8 carbon atoms or dihydroxy glycols and ether glycols with polyoxymethylene glycols in the presence of an acidic catalyst. A representative method of preparing these crosslinking agents is described in U.S. Pat. No. 2,512,950, which is incorporated herein by reference. Gamma-polyoxymethylene ethers are generally preferred sources of latent formaldehyde and a particularly preferred latent formaldehyde source for use in the practice of the invention is 2-polyoxymethylene dimethyl ether.

If utilized, the formaldehyde source is employed in an amount ranging from about 1 to 70, preferably from about 20 to 50 percent by weight of the novolak resin utilized.

The utilization of the preferred resole phenolic resin-based dispersion obviates the need for a formaldehyde donor.

The primer compositions of the present invention can optionally contain other well-known additives including plasticizers, fillers, pigments, surfactants, dispersing agents, wetting agents, reinforcing agents and the like, in amounts employed by those skilled in the adhesive arts to obtain a desired color and consistency.

The primer compositions of the present invention may be prepared by any method known in the art, but are preferably prepared by combining and milling or shaking the ingredients and water in a ball-mill, sand-mill, ceramic bead-mill, steel bead-mill, high speed media-mill, high shear mill, or the like.

The primer composition of the invention is preferably utilized to bond an elastomeric material to a metal surface. The composition may be applied to the metal surface by spraying, dipping, brushing, wiping or the like, after which the primer is permitted to dry. An adhesive overcoat can also then be applied by brushing, dipping, or spraying. The coated metal surface and elastomeric substrate are then brought together under heat and pressure to complete the bonding procedure. The surface of the metal and the elastomeric substrate are typically brought together under a pressure of from about 20.7 to 172.4 Mega Pascals (MPa), preferably from about 20 MPa to 50 MPa. The resulting rubber-metal assembly is simultaneously heated to a temperature of from about 140° C. to about 200° C., preferably from about 150° C. to 170° C. The assembly should remain under the applied pressure and temperature for a period of from about 3 minutes to 60 minutes, depending on the cure rate and thickness of the rubber substrate. This process may be carried out by applying the rubber substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, Buna-S, Buna-N, butyl rubber, brominated butyl rubber, nitrile rubber, and the like. The surface to which the material is bonded can be any surface capable of receiving the adhesive such as a glass, plastic, or fabric surface, and is preferably a metal surface selected from any of the common structural metals such as iron, steel (including stainless steel), lead, aluminum, copper, brass, bronze, Monel metal, nickel, zinc, and the like.

When utilizing the primer composition of the present invention to bond an elastomeric substrate to a metal surface, it is presently preferred to utilize the present primer composition as the primer component of a two-part adhesive composition comprising a primer component and an overcoat component. The present primer composition is utilized as a primer component by applying the composition to the metal surface and then applying an overcoat component to the coated metal surface.

The overcoat component can essentially be any rubber-adhering material, such as those materials disclosed in U.S. Pat. Nos. 2,900,292; 3,258,388; and 3,258,389. The overcoat component has been found to exhibit exceptional performance, however, when the overcoat component contains at least a second latex of a halogenated polyolefin and a nitroso compound. The latex of a halogenated polyolefin for use in the overcoat component can essentially be any of the halogenated polyolefin latexes described above with respect to the present adhesive composition. It has been found, however, that particularly beneficial results are obtained when the halogenated polyolefin latex of the overcoat component is chlorosulfonated polyethylene or poly(2,3-dichloro-1,3-butadiene).

The latex of the halogenated polyolefin of the overcoat component is typically utilized in an amount ranging from about 10 to 70, preferably from about 20 to 50, percent by weight of the essential components of the overcoat component. "Essential components of the overcoat component" herein refers to the halogenated polyolefin latex and nitroso compound.

The nitroso compound of the present invention can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The present preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds, unless otherwise specified.

Particularly preferred nitroso compounds are characterized by the formula:

$$(R)_m—Ar—(NO)_2$$

wherein Ar is selected from the group consisting of phenylene and naphthalene; R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from 1 to 8 carbon atoms; and m is zero, 1, 2, 3, or 4, and preferably is zero.

A partial non-limiting listing of nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitrosobenzene. The nitroso compound is typically utilized in an amount ranging from about 10 to 80, preferably about 20 to 50, percent by weight of the essential components of the overcoat component.

The overcoat component of the present invention preferably also contains a polymaleimide compound. The polymaleimide compound of the overcoat may be an aliphatic or aromatic polymaleimide and must contain at least two maleimide groups. Aromatic polymaleimides having from about 1 to 100 aromatic nuclei wherein the maleimide groups are directly attached to each adjacent aromatic ring are preferred. Particularly preferred polymaleimide compounds have the formula:

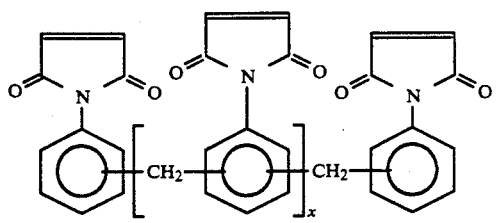

wherein x is from about 1 to 100. Such polymaleimides are common materials of commerce and are sold under different trade names by different companies, such as BMI-M-20 polymaleimide supplied by Mitsui Toatsu Fine Chemicals, Incorporated.

The polymaleimide compound is typically utilized in the present invention in an amount ranging from about 2 to 50, preferably about 5 to 15, percent by weight of the overcoat component.

The overcoat component also preferably contains a metal oxide, and the metal oxide of the overcoat component can essentially be the same as the metal oxide of the primer component and is also preferably zinc oxide. The metal oxide of the overcoat component is typically utilized in an amount ranging from about 5 to 60, preferably about 15 to 25, percent by weight of the overcoat component.

An aqueous adhesive composition which is particularly useful as the overcoat component of the present invention is described in copending U.S. application Ser. No. 07/805,396 filed Dec. 10, 1991, entitled "Aqueous Adhesives Based on Chlorosulfonated Polyethylene," the entire disclosure of which is incorporated herein by reference. Another aqueous adhesive composition useful as the overcoat composition of the present invention and based on a latex of a polymerized conjugated diene is described in U.S. Pat. No. 5,036,122, the entire disclosure of which is also incorporated herein by reference.

The overcoat component of the invention can optionally contain other well-known additives including plasticizers, fillers, pigments, surfactants, dispersing agents, wetting agents, reinforcing agents, and the like, in amounts employed by those skilled in the adhesive arts to obtain a desired color and consistency.

The overcoat component may be prepared and applied to a surface or substrate in the manner described above with respect to the present adhesive composition.

The primer component is typically applied to the surface of the metal to be bonded after which the overcoat component is applied to the coated metal surface although in some applications involving the bonding of post-vulcanized rubber, it may be possible to apply the overcoat component directly to the rubber substrate.

In order to cure or crosslink the primer component and the overcoat component to create the permanent rubber-metal bond, the surface of the metal and the rubber substrate are brought together under the conditions described above with respect to the adhesive composition of the invention.

The following examples are provided for purposes of illustrating the invention and are not intended to limit the scope of the present invention which is defined by the claims.

PREPARATION OF PRIMER COMPONENT

An adhesive primer composition according to the present invention is prepared as a primer component for a two-part adhesive composition by combining the following ingredients (except the chlorosulfonated polyethylene latex) in an amount of deionized water and propylene glycol methyl ether solvent (DOWANOL PM—The Dow Chemical Company) (50:1 ratio) sufficient to create a final total solids content (based on all ingredients) of 35 percent. These ingredients and the water/co-solvent carrier are then milled in a ceramic bead mill for 30 minutes. To the resulting millbase is then slowly added the chlorosulfonated polyethylene latex which is stirred into the millbase by slow speed agitation.

| Ingredient | No. of Grams |
| --- | --- |
| Polyvinyl Alcohol-stabilized Phenolic Resole Emulsion[a] | 297.9 |
| Chlorosulfonated Polyethylene Latex[b] | 100.6 |
| Zinc Oxide | 83.8 |
| Colloidal Silica[c] | 29.3 |
| Titanium Dioxide | 33.5 |
| Carbon Black[d] | 10.1 |
| Surfactant[e] | 1.1 |
| Dispersing Agent[f] | 1.6 |

[a]BKUA - 2370 (Union Carbide Corporation)
[b]HYPALON HYP-605 (Burke Palmison Chemical Company)
[c]M-5 CABOSIL (Cabot Corporation)
[d]STERLING NS (Cabot Corporation)
[e]POLYWET Z1766 (Uniroyal, Inc.)
[f]MARASPERSE CBOS-4 (American Can Company)

PREPARATION OF OVERCOAT COMPONENT

Overcoat Component A

An adhesive composition useful as an overcoat component is prepared in accordance with U.S. Pat. No. 5,036,122.

Overcoat Component B

An aqueous adhesive composition for use as an overcoat component is prepared in accordance with Example 1 of co-pending application Ser. No. 07/805,396 described above.

EXAMPLE 1

The primer component prepared above is coated onto grit-blasted steel coupons at a film thickness of 0.3 to 0.5 mils. Coupons are allowed to dry for approximately one hour at ambient conditions. To the coated coupons is then applied Overcoat Component A at a film thickness of approximately 0.5 to 0.8 mils. The coated coupons are then bonded to HC106 (natural rubber) by injection molding the rubber onto the coated coupons at 307° F., and then vulcanizing the rubber at 307° F. for approximately 15 minutes.

EXAMPLE 2

Bonded rubber-to-metal assemblies are prepared in accordance with Example 1 except Overcoat Component B is utilized as the overcoat component. The bonded rubber-to-metal assemblies of Examples 1 and 2 are then subjected to the test described below.

Primary Adhesion

Bonded parts are pulled to destruction according to ASTM Test D429-Method B. Parts are tested in peel with a peel angle of 45 degrees. The test is conducted at room temperature with a test speed of 20 inches per minute. After the bonded part fails, the peak peel strength value (measured in pounds) and the percent rubber retention on the adhesive coated area of the part are measured.

72-Hour Salt Spray

Bonded parts are buffed on the edges with a grinding wheel. The rubber is then tied back over the metal with stainless steel wire so as to stress the bonded area. This exposes the bond line to the environment. Failure is initiated by scoring the bond line with a razor blade. The parts are then strung on stainless steel wire and placed in a salt spray chamber. The environment inside the chamber is 100° F., 100 percent relative humidity, and 5 percent dissolved salt in the spray, which is dispersed throughout the chamber. The parts remain in this environment for 72 hours. Upon removal, the rubber is peeled from the metal with pliers. The percent rubber retention on the parts is then measured.

2-Hour Boiling Water

Bonded parts are prepared the same way as they are for the salt spray test; however, in this test, the parts are placed in a beaker filled with boiling tap water. The parts remain in this environment for 2 hours. Upon removal, the rubber is peeled from the metal with pliers. The percent rubber retention on the parts is then measured.

7-Day Room Temperature Water-Immersion

Bonded parts are prepared the same way as they are for the salt spray test. In this test, the parts are placed in a beaker filled with tap water which is at room temperature. The parts remain in this environment for 7 days. Upon removal, the rubber is peeled from the metal with pliers. The percent rubber retention on the part is then measured.

The results of the above tests are set forth in Table 1 below. In the data, reference is made to failure in the rubber body (R). Failure is expressed in terms of percent, and a high percent of failure in the rubber is desirable since this indicates that the adhesive bond is stronger than the rubber itself.

Examples 3 and 4

Bonded rubber-to-metal assemblies are prepared in accordance with the Examples 1 and 2 for Examples 3 and 4 respectively, except the coated coupons are exposed to prebake or precure heat conditions. When prebaked, the parts are exposed to the molding temperature for a period of 5 minutes before the rubber is injected into the cavity. This simulates actual production conditions and helps determine if the adhesive remains active enough to successfully bond the rubber compound.

TABLE 1

| Test | Example No. | % Rubber Failure |
| --- | --- | --- |
| Primary Adhesion | 1 | 100R |
|  | 2 | 100R |
|  | 3 | 100R |
|  | 4 | 100R |
| 2-Hour Boiling Water | 1 | 99R |
|  | 2 | 99R |
|  | 3 | 98R |
|  | 4 | 94R |
| 72-Hour Salt Spray | 1 | 83R |
|  | 2 | 100R |

TABLE 1-continued

| Test | Example No. | % Rubber Failure |
|---|---|---|
| | 3 | 99R |
| | 4 | 100R |
| 7-Day RT Water Immersion | 1 | 100R |
| | 2 | 100R |
| | 3 | 100R |
| | 4 | 100R |

As can be seen from the above data, the adhesive compositions of the present invention produce robust adhesive bonds which are capable of withstanding prebake conditions and adverse environments.

What is claimed is:

1. An aqueous primer composition comprising a polyvinyl alcohol-stabilized aqueous phenolic resin dispersion, a latex of chlorosulfonated polyethylene, and a metal oxide.

2. The primer composition according to claim 1 wherein the phenolic resin dispersion is prepared by a process comprising mixing:
   (a) a pre-formed, solid, substantially water-insoluble, phenolic resin;
   (b) water;
   (c) an organic coupling solvent; and
   (d) polyvinyl alcohol, at a temperature and for a period of time sufficient to form a dispersion of said phenolic resin in water.

3. The primer composition according to claim 2 wherein the phenolic resin is a solid resole or novolak phenolic resin.

4. The primer composition according to claim 3 wherein the resole phenolic resin is a base catalyzed resin having a formaldehyde factor of about 90 to about 180 and the novolak phenolic resin is an acid catalyzed resin having a formaldehyde factor of about 50 to about 75.

5. The primer composition according to claim 1 wherein the phenolic resin is prepared from a substituted or unsubstituted phenol.

6. The primer composition according to claim 5 wherein the substituted phenol is selected from the group consisting of cresol; bisphenol-A; and para-substituted phenols.

7. The primer composition according to claim 1 wherein the phenolic resin is a resole phenolic resin produced by reacting formaldehyde with bisphenol-A in a mole ratio from about 2 to about 3.75 moles of formaldehyde per mole of bisphenol-A in the presence of a catalytic amount of an alkali metal or barium oxide or hydroxide condensation catalyst, the reaction being carried out at elevated temperatures and the condensation reacting product being neutralized to a pH of from about 3 to about 8.

8. The primer composition according to claim 2 wherein the coupling solvent is selected from the group consisting of alcohols, ethers, esters, and ketones.

9. The primer composition according to claim 2 wherein the coupling solvent is selected from the group consisting of ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, and methoxy acetone.

10. The primer composition according to claim 1 wherein the chlorosulfonated polyethylene has a molecular weight in the range of about 50,000 to 150,000; a chloride content in the range of about 20 to 50; and a sulfur content in the range of about 0.5 to 2.

11. The primer composition according to claim 10 wherein the molecular weight of the chlorosulfonated polyethylene is in the range of about 60,000 to 120,000; the chlorine content is in the range of about 25 to 45; and the sulfur content is in the range of about 1.0 to 1.5 percent.

12. The primer composition according to claim 1 wherein the metal oxide is an oxide of zinc, cadmium, magnesium, lead, or zirconium; zirconium salts; or combinations thereof.

13. The primer composition according to claim 12 wherein the metal oxide is zinc oxide.

14. A primer composition comprising from about 20 to 80 percent by weight of a polyvinyl alcohol-stabilized aqueous phenolic resin dispersion, from about 10 to 40 percent by weight of a latex of chlorosulfonated polyethylene, and from about 10 to 80 percent by weight a metal oxide.

15. The primer composition according to claim 14 wherein the phenolic resin dispersion is present in an amount from about 40 to 60 percent by weight, the latex of chlorosulfonated polyethylene is present in an amount from about 15 to 25 percent by weight, and the metal oxide is present in an amount from about 20 to 40 percent by weight.

* * * * *